United States Patent
Tanabe et al.

(10) Patent No.: US 6,870,328 B2
(45) Date of Patent: Mar. 22, 2005

(54) LED LAMP APPARATUS FOR VEHICLES

(75) Inventors: Tetshuo Tanabe, Aichi-ken (JP); Shigeaki Tauchi, Tokyo (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/321,849

(22) Filed: Dec. 18, 2002

(65) Prior Publication Data

US 2003/0117088 A1 Jun. 26, 2003

(30) Foreign Application Priority Data

Dec. 19, 2001 (JP) ........................................ 2001-386371
Jul. 22, 2002 (JP) ........................................ 2002-212633

(51) Int. Cl.[7] .............................................. H05B 37/02
(52) U.S. Cl. ........................ 315/291; 315/77; 315/121
(58) Field of Search .......................... 315/82, 291, 77, 315/292, 86, 316, 312, 315, 200 A, 121, 123, 122, 119; 362/800

(56) References Cited

U.S. PATENT DOCUMENTS

| | | | |
|---|---|---|---|
| 5,765,940 A | | 6/1998 | Levy et al. .................. 362/240 |
| 6,166,496 A | * | 12/2000 | Lys et al. .................... 315/316 |
| 6,239,716 B1 | * | 5/2001 | Pross et al. ............. 315/200 A |
| 6,362,578 B1 | * | 3/2002 | Swanson et al. ............ 315/307 |
| 6,367,949 B1 | * | 4/2002 | Pederson ..................... 362/800 |
| 6,400,101 B1 | * | 6/2002 | Biebl et al. ................. 315/291 |
| 2001/0033503 A1 | | 10/2001 | Hamp et al. .................. 363/73 |

FOREIGN PATENT DOCUMENTS

DE 198 41 490 A1 3/2000
JP 9-212130 8/1997

* cited by examiner

Primary Examiner—Don Wang
Assistant Examiner—Ephrem Alemu
(74) Attorney, Agent, or Firm—McGinn & Gibb, PLLC

(57) ABSTRACT

In an LED unit, all of eight LEDs are connected in series. The voltage of a power supply, that is, a battery of a vehicle, 12 V, is insufficient for the eight LEDs. To cope with this, a boosting circuit is provided within the control unit to boost the voltage to about 16 V which is then applied to the eight LEDs. The front end of the LED unit is connected to a constant-current circuit, and a voltage detection circuit is provided near and connected to this constant-current circuit for detecting the voltage applied to the constant-current circuit. The voltage detected by the voltage detection circuit is compared with a reference voltage drawn from the power supply, is amplified in an amplifier, and is input as a boosting control signal into the boosting circuit. The boosting control signal is output so as to regulate the boosted voltage in such a manner that the voltage detected in the voltage detection circuit is a lowest possible voltage.

20 Claims, 6 Drawing Sheets

LED LAMP APPARATUS FOR VEHICLES

The present application is based on Japanese Patent Applications No.2001-386371 and No.2002-212633, the entire contents of which are incorporated herein by reference.

BACKGROUND OF THE INVENTION

1. Field of the Invention

This invention relates to an LED lamp apparatus such as a rear combination lamp apparatus and an LED head lamp apparatus for vehicles, which controls an LED lamp for vehicles using light emitting diodes as a light source.

In this specification, an LED chip per se is referred to as "light emitting device," and the whole system including an LED chip-mounted package resin or lens system or other optical system is referred to as "light emitting diode" or "LED."

2. Related Art

An increase in brightness of light emitting devices has led to extensive use of an LED lamp such as a rear combination lamp and an LED head lamp for vehicles using LEDs as a light source, for example, in stop lamps of automobiles. LEDs have a narrow-band emission spectrum, and the emitted light has good visibility. Further, the speed of response of LED is so high that the speed of transmission of signals to following vehicles is high and, thus, the distance necessary for stopping the travel of vehicles during high-speed traveling can be significantly reduced. In addition, since LEDs per se are a monochromatic light source, unlike incandescent lamps, there is no need to cut off light rays other than light of necessary color through a filter, and monochromatic light sources with a high emission efficiency can be realized. This also leads to energy saving.

An example of this type of an LED lamp apparatus for vehicles is shown in FIG. 1. Specifically, FIG. 1 is a circuit diagram showing an example of a conventional LED lamp apparatus for vehicles. As shown in FIG. 1, this LED lamp apparatus 50 for vehicles comprises a control unit 51 and a light emitting diode unit 52. Eight light emitting diodes 54 constituting the light emitting diode unit 52 are connected in parallel with one another.

Therefore, in the conventional LED lamp apparatus for vehicles, a current limiting circuit (a resistor or a transistor) 55 should be provided for each of the light emitting diodes 54. Increasing the number of the light emitting diodes 54 requires increasing the number of the current limiting circuits 55. This renders the heating value of the current limiting circuits 55 per se unnegligible. Further, the number of wirings necessary for connecting the control unit 51 to the light emitting diode unit 52 (power supply line+number of parallel light emitting diodes) is increased. This necessitates troublesome wiring work and incurs higher cost. Furthermore, a variation in forward voltage among the light emitting diodes 54 causes a variation in flowing current which in turn results in a variation in emitted light brightness among the light emitting diodes 54. An additional problem of the conventional technique is that, when the current limiting circuit 55 is a resistor, a fluctuation in power supply voltage causes a change in current, which flows into the light emitting diodes 54, which in turn results in a fluctuation in brightness. Furthermore, another problem of the conventional technique is as follows. In general, the voltage of a battery in an automobile is about 12 V, and the forward voltage of a light emitting diode is about 2 V. Therefore, when the arrangement of LEDs in series is contemplated for lighting, the upper limit of the number of LEDs is 6.

SUMMARY OF THE INVENTION

Accordingly, an object of the invention is to provide an LED lamp apparatus such as a rear combination lamp apparatus and an LED head lamp apparatus for vehicles, in which the generation of heat from the circuit can be minimized, the necessary number of wirings can be reduced, the emitted light brightness can be homogenized among the light emitting diodes, and a fluctuation in brightness can be prevented. A further object of the invention is to provide an LED lamp apparatus such as a rear combination lamp apparatus and an LED head lamp apparatus for vehicles, which can cope with the necessity of increasing the number of LEDs.

Therefore, an LED lamp apparatus for vehicles according to the invention includes as a light source including a predetermined number of light emitting diodes connected in series to each other or one another and a power supply of a predetermined voltage to be applied across the predetermined number of light emitting diodes, the predetermined voltage being dependent on the predetermined number of light emitting diodes.

This construction can reduce the necessary number of wirings between the power supply and the LED unit to two and thus can improve workability and can reduce cost. In addition, since LEDs are arranged in series, the same level of current flows into all LEDs. This can prevent a variation in emitted light brightness among the LEDs.

Thus, an LED lamp apparatus for vehicles can be provided wherein the necessary number of wirings can be reduced, emitted light brightness can be homogenized among light emitting diodes.

In the LED lamp apparatus for vehicles according to the invention the power supply of the predetermined voltage may include a booster for boosting a voltage of a primary power supply to the predetermined voltage.

In addition, the LED lamp apparatus for vehicles in accordance with the invention can cope with the necessity of increasing the number of LEDs.

In the LED lamp apparatus for vehicles according to the invention the power supply of the predetermined voltage may include a circuit for adjusting the predetermined voltage to a voltage dependent on a current flowing through the predetermined number of light emitting diodes.

According to the LED lamp apparatus for vehicles in accordance with the invention, even when the power supply voltage has fluctuated, a fluctuation in brightness does not occur.

Thus, this LED lamp apparatus for vehicles can be provided wherein the necessary number of wirings can be reduced, emitted light brightness can be homogenized among light emitting diodes, and a fluctuation in brightness caused by a fluctuation in power supply voltage can be prevented.

A rear combination lamp apparatus for vehicles according to the invention may include as a light source, a plurality of light emitting diodes connected to each other or one another in series, a voltage boosted from a power supply voltage being applied to the plurality of light emitting diodes for lighting.

According to the rear combination lamp apparatus for vehicles in accordance with the invention, similar to the construction as mentioned above, the necessary number of wirings can be reduced, emitted light brightness can be homogenized among light emitting diodes, and a fluctuation in brightness caused by a fluctuation in power supply voltage can be prevented.

According to the rear combination lamp apparatus for vehicles in accordance with the invention, the light emitting diodes connected in series are driven at a constant current, and a variable voltage may be applied to the light emitting diodes.

In this rear combination lamp apparatus for vehicles, LEDs are arranged in series, and the power supply voltage is boosted before application to the LEDs. Further, the LEDs are driven at a constant current, for example, by the provision of a constant-current circuit. The voltage applied to the LEDs is a variable voltage which has been regulated so that this constant current is consistent with the forward current of LEDs. This can lower the voltage applied to the constant-current circuit or the like and thus can reduce the heating value in this portion. Since heat is generated substantially only from this portion, the heating value of the whole apparatus can be reduced, contributing to improved emission efficiency.

Thus, a rear combination lamp apparatus for vehicles can be provided wherein the generation of heat from the circuit can be minimized, the necessary number of wirings can be reduced, emitted light brightness can be homogenized among light emitting diodes, and a fluctuation in brightness caused by a fluctuation in power supply voltage can be prevented.

According to the rear combination lamp apparatus for vehicles in accordance with the invention, a circuit for the voltage boosted from the power supply voltage may include a constant-current circuit and a voltage detection circuit for detecting the voltage applied to the constant-current circuit, and the voltage, which has been boosted from the power supply voltage and is to be applied to the plurality of light emitting diodes, is a variable voltage which has been regulated so that the voltage detected by the voltage detection circuit is a lowest possible voltage which can cause emission of light from the plurality of light emitting diodes.

This rear combination lamp apparatus for vehicles includes a constant-current circuit for driving LEDs at a constant current and a voltage detection circuit for detecting the voltage applied to the constant-current circuit. The level of the variable voltage is varied so that the voltage detected by the voltage detection circuit is a lowest possible voltage which can cause emission of light from the plurality of light emitting diodes, followed by the application of the varied voltage to the light emitting diodes. This can reduce the heating value in the constant-current circuit. Since heat is generated substantially only from this portion, the heating value of the whole apparatus can be reduced, contributing to improved emission efficiency.

Thus, a rear combination lamp apparatus for vehicles can be provided wherein, with higher reliability, the generation of heat from the circuit can be minimized, the necessary number of wirings can be reduced, emitted light brightness can be homogenized among light emitting diodes, and a fluctuation in brightness can be prevented.

An LED head lamp apparatus for vehicles according to the invention may include as a light source, a plurality of light emitting diodes connected to each other or one another in series, a voltage boosted from a power supply voltage being applied to the plurality of light emitting diodes for lighting.

According to the LED head lamp apparatus for vehicles in accordance with the invention, a plurality of light emitting diodes can be connected to emit light in a quantity sufficient for a head lamp, and, at the same time, the necessary number of wirings can be reduced, emitted light brightness can be homogenized among light emitting diodes, and a fluctuation in brightness caused by a fluctuation in power supply voltage can be prevented.

According to the LED head lamp apparatus for vehicles in accordance with the invention, the light emitting diodes connected in series may be driven at a constant current, and a variable voltage may be applied to the light emitting diodes.

In this LED head lamp apparatus for vehicles, similar to the rear combination lamp apparatus for vehicles, the generation of heat from the circuit can be minimized, the necessary number of wirings can be reduced, emitted light brightness can be homogenized among light emitting diodes, and a fluctuation in brightness caused by a fluctuation in power supply voltage can be prevented.

According to the LED head lamp apparatus for vehicles in accordance with the invention, a circuit for the voltage boosted from the power supply voltage may include a constant-current circuit and a voltage detection circuit for detecting the voltage applied to the constant-current circuit, and the voltage, which has been boosted from the power supply voltage and is to be applied to the plurality of light emitting diodes may be a variable voltage which has been regulated so that the voltage detected by the voltage detection circuit is a lowest possible voltage which can cause emission of light from the plurality of light emitting diodes.

In this LED head lamp apparatus for vehicles, similar to the rear combination lamp apparatus for vehicles, the generation of heat from the circuit can be minimized with higher reliability, the necessary number of wirings can be reduced, emitted light brightness can be homogenized among light emitting diodes, and a fluctuation in brightness can be prevented.

According to the LED head lamp apparatus for vehicles in accordance with the invention, an alternate circuit for current may be provided in each of the light emitting diodes connected in series.

In this LED head lamp apparatus for vehicles, even when any one of the LEDs connected in series has been extinguished due to disconnection, current can be flowed through the alternate circuit, whereby the remaining LEDs can remain lighted without interruption.

Thus, an LED head lamp apparatus for vehicles can be provided wherein emitted light brightness can be homogenized among light emitting diodes, a fluctuation in brightness can be prevented, and, in addition, simultaneous extinguishing of all the light emitting diodes upon disconnection can be avoided.

BRIEF DESCRIPTION OF THE DRAWINGS

The invention will be explained in more detail in conjunction with the appended drawings, wherein.

DESCRIPTION OF THE PREFERRED EMBODIMENTS (First Embodiment)

Figure 1:
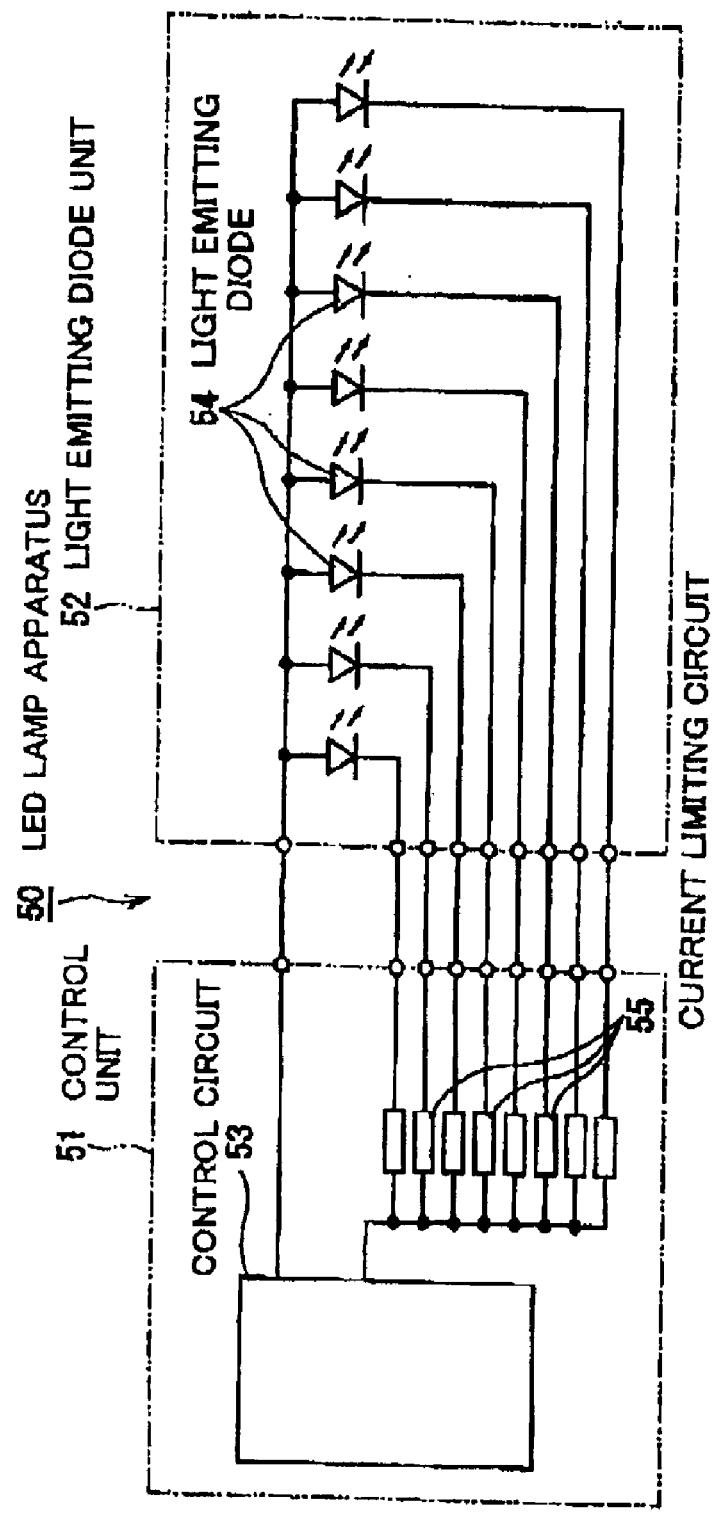
FIG. 1 is a circuit diagram showing an example of a conventional LED lamp apparatus for vehicles.
Figure 2:
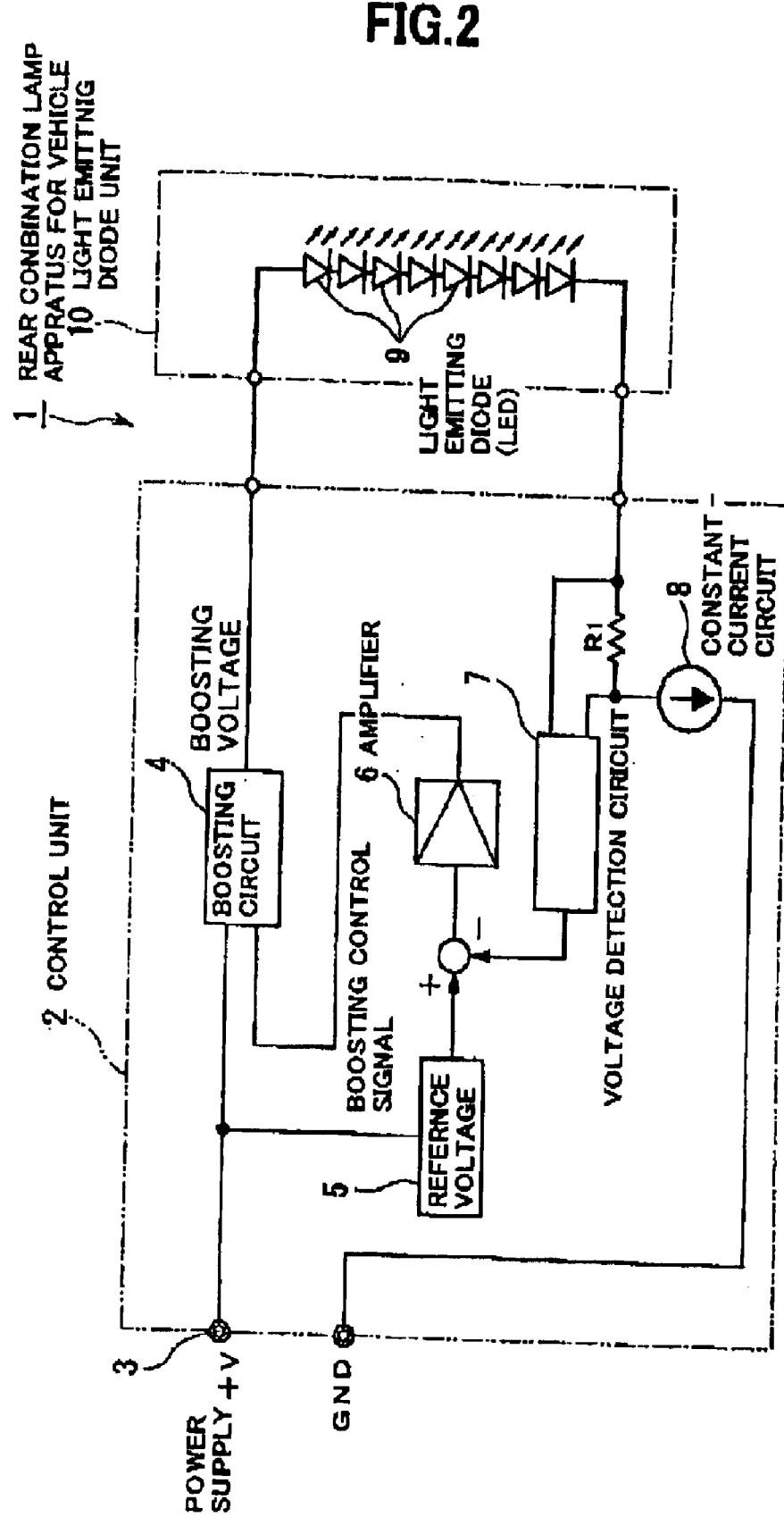
FIG. 2 is a schematic circuit diagram showing a circuit in a rear combination lamp apparatus for vehicles in a first embodiment of the invention.
Figure 3:
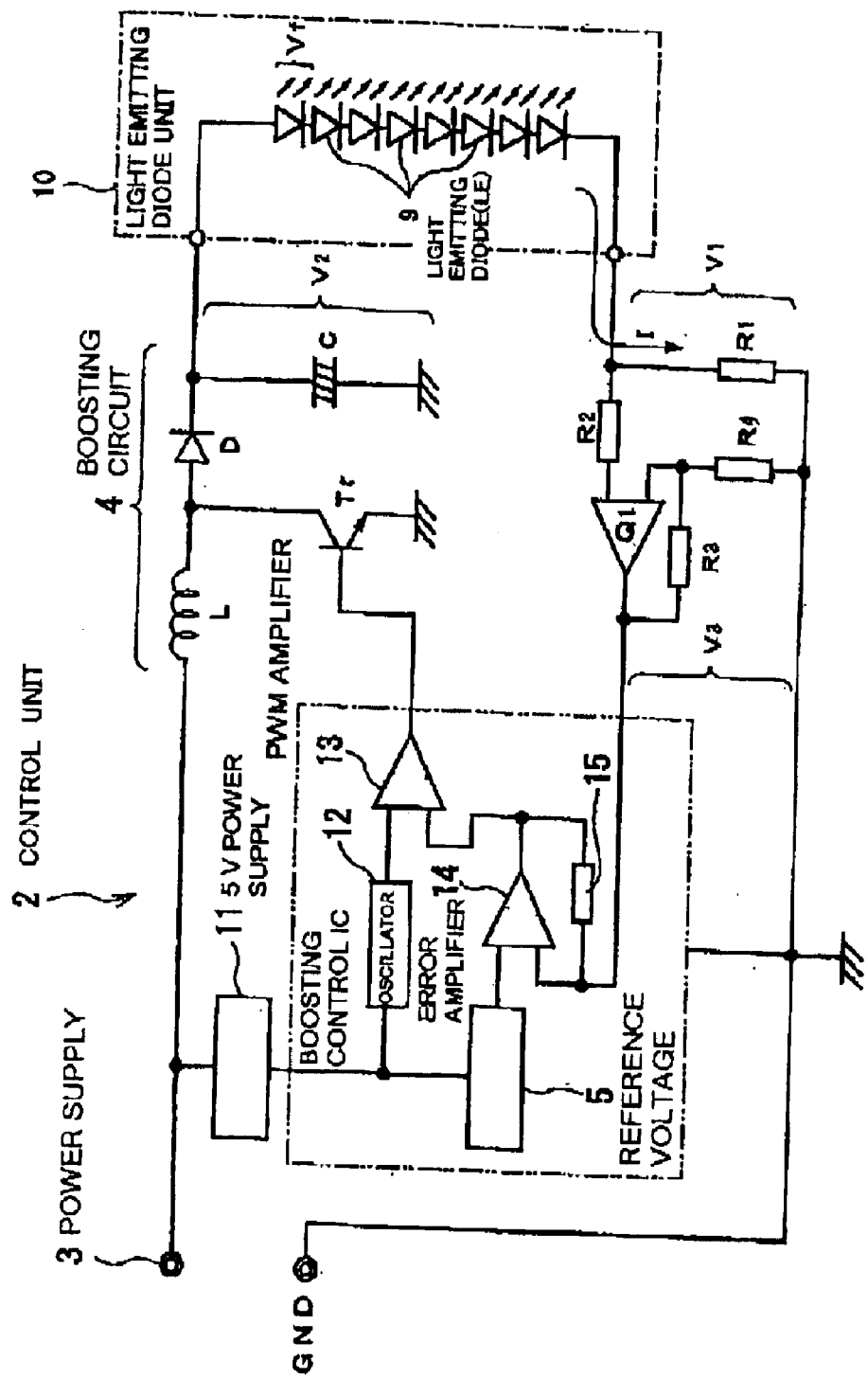
FIG. 3 is a circuit diagram showing, in more detail, the circuit in the rear combination lamp apparatus for vehicles in the embodiment of the invention.

First embodiment of the invention will be explained in conjunction with FIGS. 2 and 3. FIG. 2 is a schematic circuit diagram showing a circuit in a rear combination lamp apparatus for vehicles in first embodiment of the invention. FIG. 3 is a circuit diagram showing, in more detail, the circuit in the rear combination lamp apparatus for vehicles in the first embodiment of the invention.

As shown in FIG. 2, a rear combination lamp apparatus 1 for vehicles in this embodiment of the invention includes a control unit 2 and a light emitting diode unit 10. In this LED unit 10, all of eight LEDs 9 are connected in series to constitute a rear combination lamp. The voltage of a power supply 3, that is, a battery of a vehicle, is about 12 V, while the LED unit 10 requires about 16 V (about 2 V×8=about 16 V). Therefore, a shortage of voltage occurs. To cope with this, a boosting circuit 4 is provided within the control unit 2 to boost the voltage to about 16 V which is then applied to the eight LEDs 9. The front end of the LED unit 10 is connected to a constant-current circuit 8 and is grounded. A voltage detection circuit 7 is provided near and connected to this constant-current circuit 8 for detecting the voltage applied to the constant-current circuit 8. The voltage detected by the voltage detection circuit 7 is compared with a reference voltage 5 drawn from the power supply 3, is amplified in an amplifier 6, and is input as a boosting control signal into the boosting circuit 4. The boosting control signal is output so as to regulate the boosted voltage in such a manner that the voltage detected in the voltage detection circuit 7 is a lowest possible voltage.

This construction can minimize the quantity of heat generated from the constant-current circuit 8 per se and thus can enhance circuit efficiency. The connection of all the eight LEDs 9 in series permits the same level of current to flow into all the LEDs and thus can prevent a variation in emitted light brightness among the LEDs. Further, the voltage (boosted voltage) applied to the LEDs 9 is regulated. Therefore, even when the power supply voltage has fluctuated, the brightness of the LEDs 9 does not fluctuate. Furthermore, the necessary number of wirings between the control unit 2 and the LED unit 10 is only two. Therefore, the workability can be improved, and the cost can be reduced.

Next, the operation of the circuit will be explained in more detail in conjunction with FIG. 3. In this embodiment, the boosting circuit 4 for boosting a voltage to generate a boosted voltage V2 to be applied to the LEDs 9 utilizes a chopper method using a coil L and a transistor Tr. A rectifying diode D and a smoothing capacitor C are also used. The transistor Tr is repeatedly turned ON and OFF at a high speed. The boosted voltage V2 can be varied by regulating the duty ratio with respect to ON and OFF of the transistor Tr. Duty ratio=ON time of transistor Tr/(ON time+OFF time). The boosted voltage V2 increases with increasing the duty ratio and lowers with decreasing the duty ratio. The current I flowed through the eight LEDs 9 flows into a resistor R1. This resistor R1 corresponds to the constant-current circuit 8 shown in FIG. 2.

A voltage V1 of the resistor R1 is detected by an operational amplifier Q1, is amplified to a voltage V3, and is input into a boosting control IC. Resistors R2, R3, R4 are configured to determine the amplification factor of the operational amplifier Q1. Therefore, the operational amplifier Q1 and the resistors R2, R3, R4 constitute the voltage detection circuit 7 shown in FIG. 2. In the boosting control IC, the input V3 is compared with the internal reference voltage 5. The duty ratio of the transistor Tr in the boosting circuit 4 is controlled so that the input V3 and the reference voltage 5 are always equal to each other. An oscillator 12 in the boosting control IC determines the cycle period of ON and OFF of the transistor Tr. A PWM amplifier 13 functions to determine the duty ratio and to drive the transistor Tr.

For example, when the voltage of the battery 3 has been lowered for some reasons, the voltage V2 is first lowered. At the same time, the quantity of current I, which flows into the LEDs 9, is reduced, and the voltage V1 of the resistor R1 is also lowered. This in turn causes a lowering in voltage V3. As a result, a difference occurs between the voltage V3 and the reference voltage 5 in the boosting control IC. In the boosting control IC, in order to eliminate this difference, control is performed so as to increase the duty ratio of the transistor Tr. Finally, the voltage V2 is raised, and the voltage becomes stable at the value before the change of the voltage.

In this circuit, control is performed so that the value of the voltage V1 is rendered constant. Therefore, the current I, which flows into the LEDs 9, is I=V1/R1 and is constant. In other words, the resistor R1 constitutes a constant-current circuit.

If the value of the voltage V1 is not increased to a higher value than is needed, the generation of heat from the resistor R1 could be suppressed and unnecessary heat generation could be reduced. For example, in the conventional circuit wherein all of the eight LEDs are connected in parallel and a resistor is used for each LED for current limitation purposes, the electric power as a source of heat generated in the resistor can be determined as follows. Assuming that the power supply voltage is 12 V, the forward voltage Vf of LED is 2 V, and the current, which flows into LED, is 0.02 A, the voltage applied to each resistor is 12 V−2 V=10 V. Therefore, the total electric power of all the resistors is $$10 \text{ V} \times 0.02 \text{ A} \times 8 \text{ (number of resistors)} = 1.6 \text{ W}.$$

On the other hand, in the circuit shown in FIG. 3, assuming that control is performed so as for the voltage V1 to be 1 V and the current, which flows into LED, is the same as that in the conventional circuit, that is, is 0.02 A, the electric power in the resistor R1 is $$1 \text{ V} \times 0.02 \text{ A} = 0.02 \text{ W}.$$

This value is much lower than the value in the conventional circuit.

Further, even when a variation in characteristics of the LEDs 9 has resulted in a change in the forward voltage Vf, the voltage V1 is constant and the variation is absorbed by a change in the boosted voltage V2. This means that, even when the forward voltage Vf of the LEDs 9 is varied to a lower value, the heating value of the resistor R1 is not increased.

The overall efficiency in the invention will be compared with that in the conventional circuit. In the conventional technique wherein all the eight LEDs are connected in parallel, the total electric power consumed in the LEDs is $$2 \text{ V} \times 0.02 \text{ A} \times 8 \text{ (number of resistors)} = 0.32 \text{ W}.$$

Regarding the input electric power supplied from the power supply, the electric power consumed in the control circuit is small and thus is negligible. Therefore, the electric power is $$12 \text{ V} \times 0.02 \text{ A} \times 8 \text{ (parallel)} = 1.92 \text{ W}.$$

Accordingly, the efficiency is 0.32/1.92×100=16.7 (%).

On the other hand, in the circuit shown in FIG. 2, the electric power consumed in the LEDs 9 is 2 V×0.02 A×8 (number of resistors)=0.32 W.

The electric power consumed in the resistor R1 is

1 V×0.02 A=0.02 W.

It is assumed that the efficiency of the boosting circuit 4 is 70%. Regarding the input electric power supplied from the power supply, as with the conventional circuit, the electric power consumed in the control circuit is small and thus is negligible. Therefore, the electric power is (0.32 W+0.02 W)/0.7=0.48 W.

Accordingly, the efficiency is 0.32/0.48×100=66.7 (%).

This efficiency value is much higher than that in the conventional circuit.

Thus, in the rear combination lamp apparatus for vehicles in this embodiment, the generation of unnecessary heat can be prevented. Even when there is a variation in forward voltage Vf among the LEDs, this variation can be absorbed by a change in the boosted voltage V2 to prevent an increase in heating value of the constant-current circuit. Further, the efficiency is much higher than that in the conventional parallel circuit.

In this embodiment, a chopper method is used for boosting the power supply voltage. However, it should be noted that there are various methods for boosting the power supply voltage including a charge pump method and a transformer method and any of them may be used in the invention.

In the rear combination lamp apparatus for vehicles, construction, shape, quantity, materials, size, connection relation, etc. of other parts are also not limited to the above embodiment.

(Second Embodiment)

Figure 4:
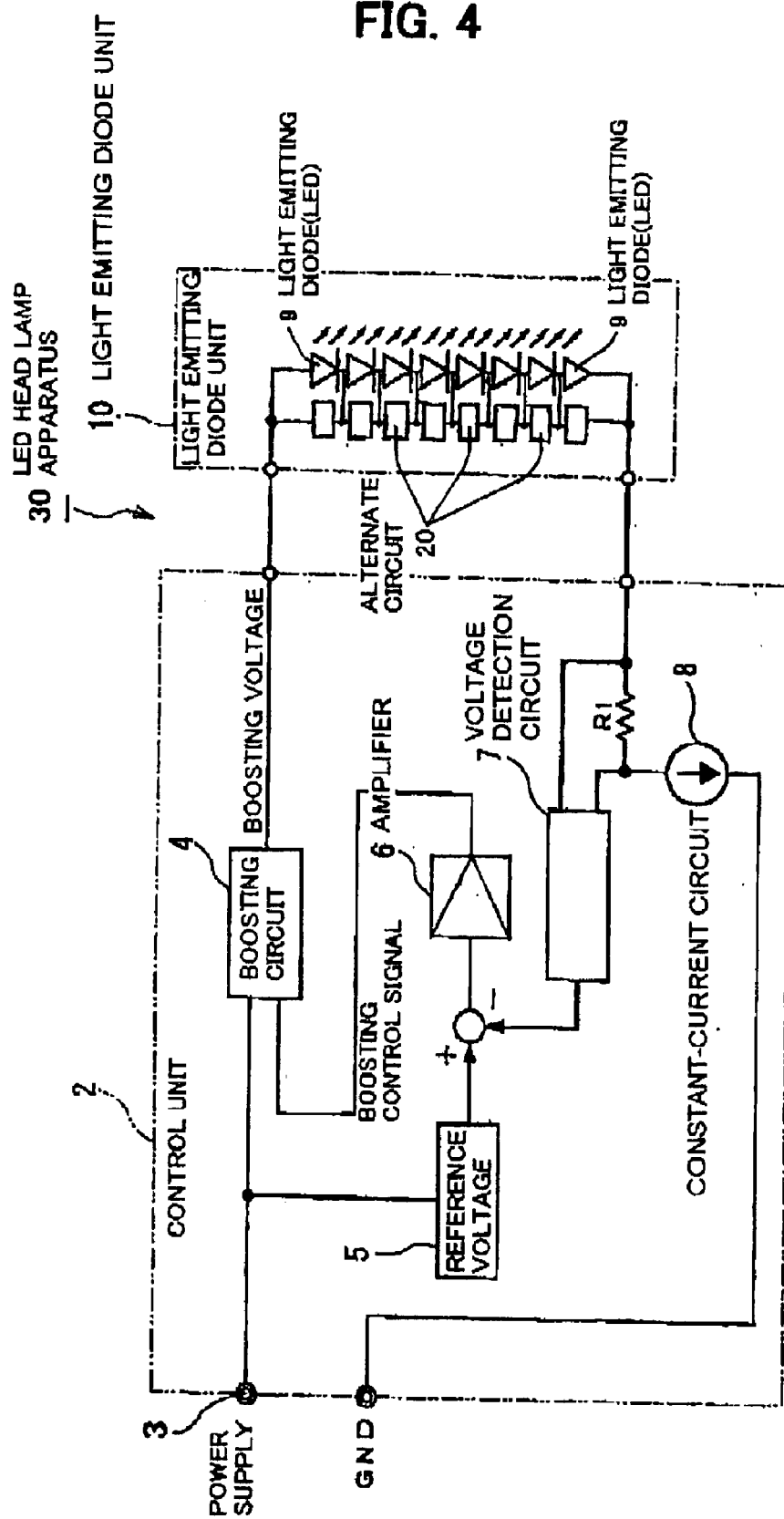
FIG. 4 is a schematic circuit diagram showing a circuit in an LED head lamp apparatus for vehicles in a second embodiment of the invention.
Figure 5:
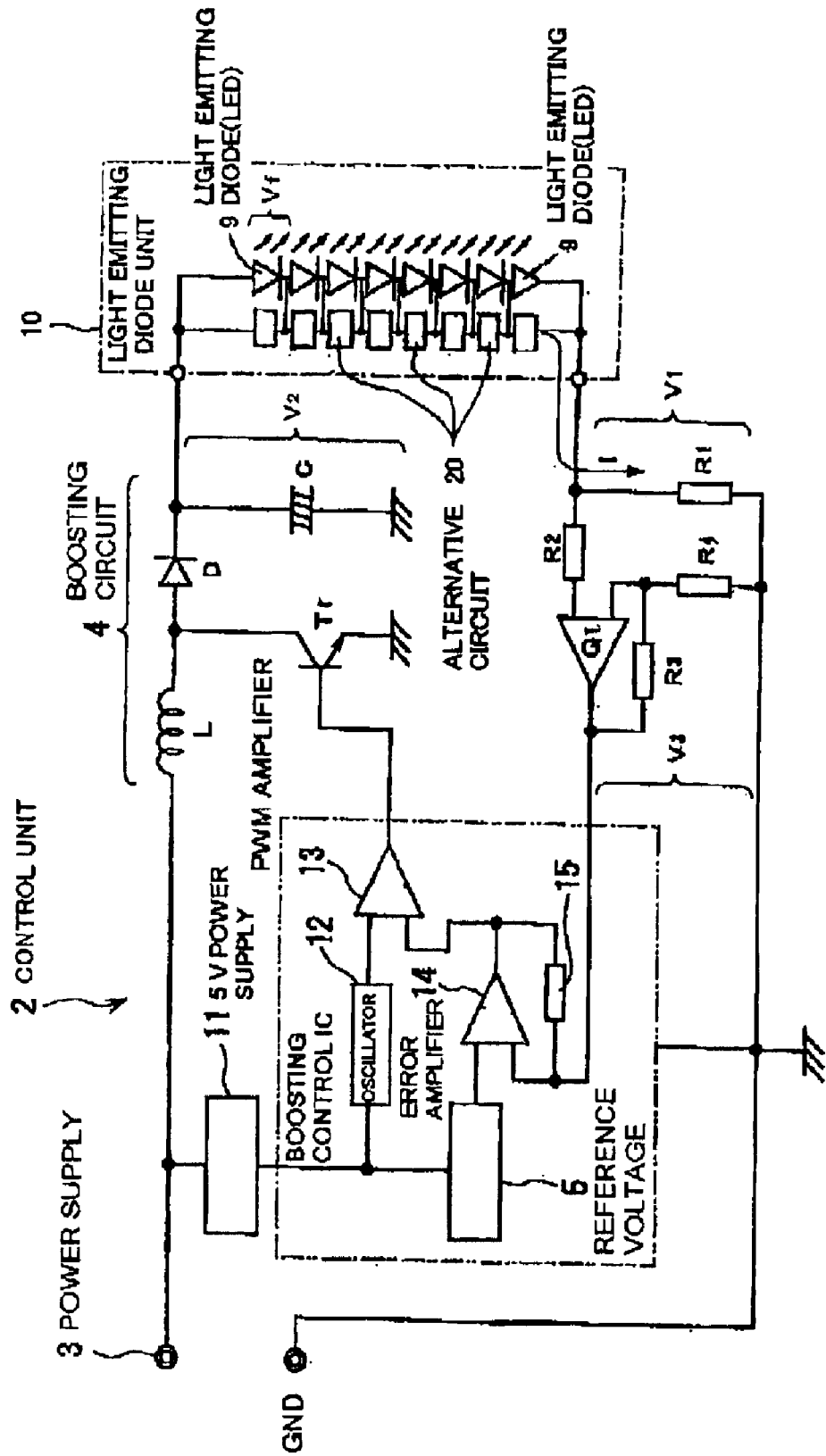
FIG. 5 is a circuit diagram showing, in more detail, the circuit in the LED head lamp apparatus for vehicles in the embodiment of the invention.
Figure 6:
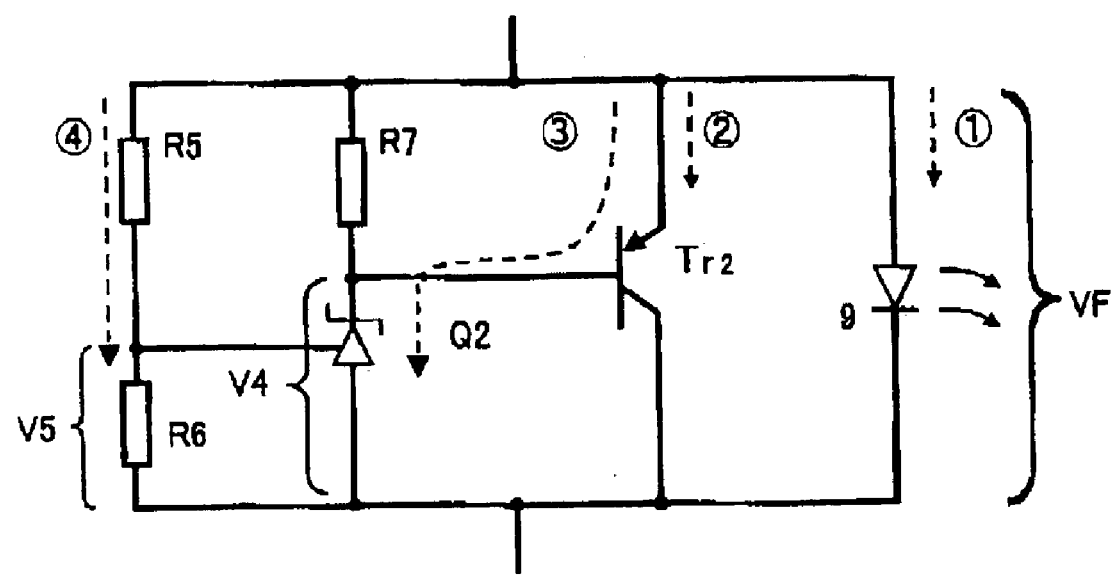
FIG. 6 is a circuit diagram showing an alternate path for disconnection of LED.

A second embodiment of the invention will be explained in conjunction with FIGS. 4–6. FIG. 4 is a schematic circuit diagram showing a circuit in an LED head lamp apparatus for vehicles in the second embodiment of the invention. FIG. 5 is a circuit diagram showing, in more detail, the circuit in the LED head lamp apparatus for vehicles in the second embodiment of the invention. FIG. 6 is a schematic diagram showing a circuit of each LED 9 in an LED head lamp apparatus for vehicles in the second embodiment of the invention.

As shown in FIGS. 4 and 5, an LED head lamp apparatus 30 for vehicles in this embodiment of the invention is similar to the first embodiment with the exception that in this LED unit 10, an alternate circuit 20 for coping with disconnection is provided in each of the eight LEDs 9 connected in series. Therefore, in FIGS. 4 and 5, parts similar to those previously described with reference to FIGS. 2 and 3 are denoted by the same reference numerals, and the explanation thereof is abridged.

As shown in FIG. 6, in each LED 9 in the LED head lamp apparatus 30 for vehicles in this embodiment, resistors R5, R6 for dividing the voltage across both ends of the LED 9 are provided in parallel to the LED 9. Further, a transistor Tr2 for an alternate circuit for current and a shunt regulator Q2 for driving the transistor Tr2 are connected in parallel to the resistors R5, R6 and the LED 9, as shown in the drawing. Here R5=27 kΩ, R6=68 kΩ, and reference voltage of Q2=2.5 V.

When the light emitting diodes 9 are normally lighting, the current flows into the LED 9 through a path ①. In this case, the forward voltage Vf of the LED is 2.0 V, and the voltage applied to R5 is

V5=2.0×68/(27+68)=1.43 V.

At that time, Q2 functions to bring Vf to the reference voltage 2.5 V and raises V4 to render the value of V4 substantially equal to the Vf value. Therefore, as shown in a path ③, a base current for turning ON Tr2 does not flow into Tr2. That is, Tr2 remains turned OFF, and any current does not flow through a path ② as an alternate path.

On the other hand, upon disconnection of the light emitting diode 9, the current does not flow through the path ①, and, instead, the current flows into a path ④. The values of resistance of R5 and R6 are so high that the Vf value is rapidly raised to a value close to the power supply voltage value. At the same time, the value of V5 is also raised. In this case, in order to lower the value of V4, Q2 functions to suppress the value of V5 to the reference voltage 2.5 V. This allows a base current of Tr2 to flow through the path ③. As a result, Tr2 is turned ON, and an alternate path for current is formed by Tr2.

Thus, even when the path ① is shut off as a result of the disconnection of the light emitting diode 9, the current path is instantaneously changed from the path ① to the path ② and, consequently, the current continues to flow. Therefore, the other light emitting diodes continue to light. Thereafter, the value of Vf is stabilized by Q2 at about 3.5 V.

In this embodiment, a shunt regulator and a transistor are used for detecting disconnection and for forming an alternate path for current. Alternatively, for example, a circuit using a thyristor or a circuit comprising a combination of transistors may be used. The adoption of these circuits can offer the same effect as attained in this embodiment.

What is claimed is:

1. A light emitting diode (LED) lamp apparatus for a vehicle, comprising:
    a light source comprising a plurality of light emitting diodes connected in series, a power supply voltage being applied to the plurality of light emitting diodes; and
    an alternate circuit for current provided for each of the light emitting diodes,
    wherein said alternate circuit comprises a transistor and a shunt regulator for driving the transistor, said transistor and said shunt regulator being connected in parallel to each of the plurality of light emitting diodes.

2. The LED lamp apparatus for a vehicle according to claim 1, wherein the LED lamp aparatus comprises one of a head lamp apparatus for a vehicle and a rear combination lamp apparatus for a vehicle.

3. The LED lamp apparatus for a vehicle according to claim 1,
    wherein the plurality of light emitting diodes are driven to a constant current, and
        wherein a variable voltage is applied to the plurality of light emitting diodes.

4. The LED lamp apparatus for a vehicle according to claim 3, further comprising:
    a circuit for the power supply voltage comprising:
        a constant-current circuit; and a voltage detection circuit for detecting a voltage applied to the constant-current circuit;

wherein a variable applied to the plurality of light emitting diodes is such that the voltage detected by the voltage detection circuit is a lowest possible voltage which can cause emission of light from the plurality of light emitting diodes.

5. The LED lamp apparatus for a vehicle according to claim 1, wherein a voltage boosted from a power supply voltage is applied to the plurality of light emitting diodes.

6. The LED lamp apparatus for a vehicle according to claim 5, wherein the plurality of light emitting diodes are driven at a constant current, and wherein a variable voltage is applied to the plurality of light emitting diodes.

7. The LED lamp apparatus for a vehicle according to claim 6, further comprising:

a circuit for the voltage boosted from the power supply voltage comprising:
 a constant-current circuit; and
 a voltage detection circuit for detecting a voltage applied to the constant-current circuit, wherein the variable voltage applied to the plurality of light emitting diodes is such that the voltage detected by the voltage detection circuit is a lowest possible voltage which can cause emission of light from the plurality of light emitting diodes.

8. The LED lamp apparatus for a vehicle according to claim 1, further comprising:

a control circuit for controlling a power supplied to said light source, said control circuit comprising:
 a boosting circuit for boosting a voltage of said power supply to said predetermined voltage; and
 a constant-current circuit, a front end of said light emitting diodes being connected to said constant current circuit.

9. The LED lamp apparatus for a vehicle according to claim 8, wherein said boosting circuit comprises:

a coil coupled to said power supply; and
a transistor having one arm grounded and another arm coupled to an output of said coil.

10. The LED lamp apparatus for a vehicle according to claim 8, wherein said control circuit further comprises:

a voltage detection circuit connected to said constant-current circuit, for detecting a voltage applied to said constant-current circuit; and
an amplifier for comparing a reference voltage which is drawn from said power supply with said voltage detected by said voltage detection circuit.

11. The LED lamp apparatus for a vehicle according to claim 10, wherein said amplifier outputs a boosting control signal to said boosting circuit, said boosting control signal causing said boosting circuit to adjust said predetermined voltage supplied to said light-emitting diodes such that said voltage detected by said voltage detection circuit is a lowest possible voltage for causing emission of light from said light emitting diodes.

12. The LED lamp apparatus for a vehicle according to claim 11, wherein said boosting circuit comprises:

a coil connected to said power supply;
a transistor having a base which receives said boosting control signal, and having one arm grounded and another arm coupled to an output of said coil;
a rectifying diode which receives an output of said coil; and
a smoothing capacitor which receives an output of said rectifying diode.

13. The LED lamp apparatus for a vehicle according to claim 12, wherein said voltage detection circuit comprises:

an operational amplifier; and
a plurality of resistors operatively coupled to said operational amplifier, for determining an amplification factor of said operational amplifier.

14. A rear combination lamp apparatus for a vehicle, comprising:

a light source comprising a plurality of light emitting diodes connected in series, a voltage boosted from a power supply voltage being applied to the plurality of light emitting diodes; and
an alternate circuit for current provided for each of the light emitting diodes connected in series
wherein said alternate circuit comprises a transistor and a shunt regulator for driving the transistor, said transistor and said shunt regulator being connected in parallel to each of the plurality of light emitting diodes.

15. The rear combination lamp apparatus for a vehicle according to claim 14, further comprising:

a control circuit for controlling a power supplied to said light source, said control circuit comprising:
 a boosting circuit for boosting a voltage of said power supply to said predetermined voltage; and
 a constant current circuit, a front end of said light emitting diodes being connected to said constant current circuit.

16. The rear combination lamp apparatus for a vehicle according to claim 15, wherein said boosting circuit comprises:

a coil coupled to said power supply; and
a transistor having one arm grounded and another arm coupled to an output of said coil.

17. The rear combination lamp apparatus for a vehicle according to claim 15, wherein said control circuit further comprises:

a voltage detection circuit connected to said constant current circuit, for detecting a voltage applied to said constant current circuit; and
an amplifier for comparing a reference voltage which is drawn from said power supply with said voltage detected by said voltage detection circuit.

18. The rear combination lamp apparatus for a vehicle according to claim 17, wherein said amplifier outputs a boosting control signal to said boosting circuit, said boosting control signal causing said boosting circuit to adjust said predetermined voltage supplied to said light-emitting diodes such that said voltage detected by said voltage detection circuit is a lowest possible voltage for causing emission of light from said light emitting diodes.

19. The rear combination lamp apparatus for a vehicle according to claim 18, wherein said boosting circuit comprises:

a coil connected to said power supply;
a transistor having a base which receives said boosting control signal, and having one arm grounded and another arm coupled to an output of said coil;
a rectifying diode which receives an output of said coil; and
a smoothing capacitor which receives an output of said rectifying diode.

20. The rear combination lamp apparatus for a vehicle according to claim 18, wherein said voltage detection circuit comprises:

an operational amplifier; and
a plurality of resistors operatively coupled to said operational amplifier, for determining an amplification factor of said operational amplifier.

* * * * *